(12) United States Patent
Tziovaras et al.

(10) Patent No.: US 7,144,540 B2
(45) Date of Patent: Dec. 5, 2006

(54) METHOD OF MAKING METALLIZED PLASTIC MOLDINGS AND THEIR USE

(75) Inventors: Georgios Tziovaras, Solingen (DE); Dirk Pophusen, Bergisch Gladbach (DE); Hans-Georg Gehrke, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 122 days.

(21) Appl. No.: 10/389,654

(22) Filed: Mar. 14, 2003

(65) Prior Publication Data

US 2003/0178739 A1 Sep. 25, 2003

(30) Foreign Application Priority Data

Mar. 20, 2002 (DE) ................. 102 12 304

(51) Int. Cl.
*B29C 45/00* (2006.01)
*B29C 45/14* (2006.01)

(52) U.S. Cl. .................. 264/328.1; 264/241; 264/259; 427/270; 427/271

(58) Field of Classification Search ................. 264/21, 264/241, 308, 328.1; 427/270, 271
See application file for complete search history.

(56) References Cited

U.S. PATENT DOCUMENTS

| | | | | |
|---|---|---|---|---|
| 3,839,129 A | * | 10/1974 | Neumann | 428/61 |
| 4,268,541 A | * | 5/1981 | Ikeda et al. | 427/177 |
| 4,599,298 A | * | 7/1986 | Fisch | 430/271.1 |
| 4,710,419 A | * | 12/1987 | Gregory | 428/210 |
| 4,877,657 A | * | 10/1989 | Yaver | 428/31 |
| 5,005,949 A | * | 4/1991 | Egawa et al. | 359/601 |
| 5,108,530 A | | 4/1992 | Niebling, Jr. et al. | 156/245 |
| 5,217,563 A | | 6/1993 | Niebling et al. | 156/382 |
| 5,233,753 A | * | 8/1993 | Wolf et al. | 29/831 |
| 5,808,758 A | * | 9/1998 | Solmsdorf | 359/2 |
| 6,236,442 B1 | * | 5/2001 | Stephenson et al. | 349/142 |
| 6,411,029 B1 | | 6/2002 | Czak | 313/509 |
| 6,576,539 B1 | * | 6/2003 | Lin | 438/611 |
| 2002/0021086 A1 | | 2/2002 | Czak | 313/503 |
| 2003/0102204 A1 | * | 6/2003 | Shimizu et al. | 200/341 |

FOREIGN PATENT DOCUMENTS

| | | |
|---|---|---|
| DE | 296 04 910 | 7/1996 |
| DE | 296 04 910 | 8/1996 |
| DE | 100 58 090 | 10/2002 |
| EP | 0 734 885 | 10/1996 |
| JP | 11-329139 | 11/1999 |

* cited by examiner

*Primary Examiner*—Christina Johnson
*Assistant Examiner*—Monica A. Huson
(74) *Attorney, Agent, or Firm*—Joseph C. Gil; Aron Preis

(57) ABSTRACT

A method of making a plastic molding is disclosed. The multi-step method entails applying a metallic layer 20 to 150 nm thick to a translucent plastic film having a thickness of 50 to 750 μm, removing part of the metallic layer, and applying to the metallized side of the film an adhesive layer 5 to 50 μm in thickness to obtain a product, and injection molding the product with a translucent thermoplastic. The plastic molding thus made is suitable for the preparation of keys, fittings, trim strips, reflectors, keyboards, casings, shields, advertising panels and packaging items and identification cards.

11 Claims, No Drawings

METHOD OF MAKING METALLIZED PLASTIC MOLDINGS AND THEIR USE

FIELD OF THE INVENTION

The invention relates to a method of making metallized plastic moldings and use of the moldings thus made.

SUMMARY OF THE INVENTION

A method of making a plastic molding is disclosed. The multi-step method entails applying a metallic layer 20 to 150 nm thick to a translucent plastic film having a thickness of 50 to 750 μm, removing part of the metallic layer, and applying to the metallized side of the film an adhesive layer 5 to 50 μm in thickness to obtain a product, and injection molding from the reverse (back-molding) the product with a translucent thermoplastic. The plastic molding thus made is suitable for the preparation of keys, fittings, trim strips, reflectors, keyboards, casings, shields, advertising panels and packaging items.

BACKGROUND OF THE INVENTION

Plastic moldings which have a metallic gloss in addition to the usual decoration (for example handwritten words or flourishes, logos) are made by printing pre-fabricated metallized films then shaping them and back-spraying them with a plastic. Alternatively translucent plastic films are printed first then metallized. They are shaped thereafter and a protective layer is optionally applied to the metallic layer. These processes are carried out, for example, to produce plastic parts for cars, such as hub covers etc. They have the disadvantage that parts thus produced are not translucent owing to the metallic layer, and hence transmitted light methods cannot be used on those parts.

The problem addressed by the invention was therefore to provide a method enabling plastic moldings with a metallic gloss and other conventional decorative effects to be produced in a technically simple manner. The parts thus produced must also enable transmitted light technology to be used.

This problem has been solved by the method of the invention.

DETAILED DESCRIPTION OF THE INVENTION

The subject of the invention is a method of making a plastic molding which is characterized in that a) a metallic layer from 20 nm to 150 nm thick is applied to a translucent plastic film from 50 μm to 750 μm thick, b) the metallic layer on the metallized film of a) is partly removed, c) an adhesive layer from 5 μm to 50 μm thick is thereupon applied to the metallized side of the film, d) a printed or non-printed, translucent plastic film from 50 μm to 750 μm thick is then optionally laminated onto the adhesive layer of c), e) a decorative layer from 3 μm to 40 μm thick is optionally then applied to the film of d) or the layer of c), f) the product of c), d) or e) is optionally shaped and g) the product of f) is finally injection-molded with a translucent thermoplastic.

In the method of the invention a metallic layer is applied to a translucent plastic film. The metallic layer is preferably applied by the so-called PVD (physical vapour deposition) process or the CVD (chemical vapour deposition) process. Alternatively the layer may be applied preferably by transfer metallization (see for example Joachim Nentwig, Kunststoff-Folien 2000, Carl Hanser Verlag, Munich, Vienna). The metals used are typically aluminium, chromium, silver, nickel and gold.

The metallic layer is thereupon removed from the desired places/areas of the plastic film. This is preferably done by means of a laser beam (see for example Gottfried W. Ehrenstein, Stefan Stampfer, 3D-spritzgegossene Formteile mit strukturiertem Leiterbild, Spritzgießen 2000—Internationale Jahrestagung [3D injection molded parts with a structured printed circuit pattern, Injection Molding 2000—Annual International Conference], VDI-Verlag, 2000). The metallic layer may alternatively be partly removed, for example, by etching. If lasers are used for partial removal of the metallic layer step b) [partial removal of the metallic layer] may preferably take place after step g). Laser beam removal of the metallic layer may likewise take place after step c), d), e) or f). The thickness of the layer is normally in the nanometer range. The metallic layer is removed by the laser beam at the point where the beam strikes it, thereby creating an area through which light may, if so desired, pass by transmitted light (back-light) technology.

The adhesive layer is preferably applied to the metallized side of the film by screen printing. It may alternatively be applied with a doctor blade or by spraying. Its function is also to protect the metallic layer. Heat-activated polyurethane adhesives are preferably employed, as described for example in "Adhesion-Kleben und Dichten" by Dr G Festel, Dr A Proβ, Dr H Stepanski, Dr H Blankeheim, Dr R Witkowski, Friedrich Vieweg & Sohn Verlagsgesellschaft mbH, Wiesbaden.

A printed or non-printed, translucent plastic film is thereupon optionally laminated onto the adhesive layer. A colored film may alternatively be used. Such a film can prevent or reduce loss of gloss in the metallic layer. Loss of gloss may occur during injection-molding(back-molding) at high temperatures. Lamination is preferably carried out at temperatures below the softening point of the film.

A decorative layer is then optionally applied. This is preferably done by screen printing. However application may alternatively be by offset, gravure, transfer or digital printing. The inks employed for the purpose should be translucent.

Shaping is then carried out. The so-called "high-pressure forming" process is preferably used, as described for example in DE-A 3 844 584. The film is preferably shaped below its softening temperature, so that the gloss of the metallic layer is not adversely affected.

Other methods are mechanical shaping and hydro-forming. If the geometry of the part permits (for example if a flat part is only slightly curved), shaping may be effected by the pressure of the thermoplastic during back-spraying, so that the additional shaping step may be omitted. After the shaping step protruding residual pieces may be removed, preferably by punching. Alternatively they may be removed by laser beam cutting, water jet cutting or milling.

The part is finally injection-molded from the reverse with a translucent thermoplastic.

The plastic moldings made by the method of the invention are used as keys, switches and fittings, particularly in the motor vehicle field and the electronics field, as trim strips, particularly in the vehicle exterior field, as reflectors particularly for lamps and headlights, as keyboards and casings particularly for telephones and mobile phones, as shields and keys particularly for household appliances, as advertising panels and as packaging items and as identification card The invention is further illustrated but is not intended to be limited by the following examples in which all parts and percentages are by weight unless otherwise specified.

EXAMPLE a) Metallizing a polycarbonate film (Makrofol® DE1-1C, 175 μm from Bayer AG) with aluminium.

The film was subjected to preliminary plasma treatment to increase adhesion of the metallic layer to the film. The aluminium was applied in a thickness of 80 nm by the PVD process (direct metallization). Metallization was carried out on a Heraeus-Leibold metallizing plant.

b) Removal of the Al layer in selected areas by laser Precision removal of the Al layer was carried out with a Rofin Sinar "Marker Power Line 60" laser plant.

Trial set-up:

| | |
|---|---|
| Laser medium: | Nd YAG |
| Capacity: | 60 watt |
| Current: | 8.5 A |
| Wavelength: | 1064 nm |
| Pulse frequency: | 4.1 kHz |
| Feed speed: | 200 mm/sec | c) Application of an adhesive layer

Adhesive "Aquapress® ME" produced by Pröll was applied by screen printing. Printing was carried out three times. The polyester fabric screen used had 100 threads per cm. When the printed films had been dried the thickness of the adhesive layer was 20 μm.

d) Additional film

A polycarbonate film 100 μm thick (Makrofol® DE1-4, 175 μm from Bayer AG) was laminated onto the product of c). Lamination took place at a film temperature of 90° C. and an application pressure of 4 bar.

e) Decorative layer

The translucent "Noriphan® HTR" ink system produced by Proll was applied by screen printing. Printing was carried out once. The fabric screen made of polyester had 100 threads per cm. When the printed film had dried the thickness of the ink layer was 6 μm.

f) The product from e) was shaped by high-pressure forming and the protruding residual pieces were cut off. The product temperature was approx. 80° C. and the mold temperature approx. 75° C.

g) The shaped product from f) was injection-molded with Makrolon® 2400 (polycarbonate from Bayer AG). The material temperature was 290° C. and the mold temperature 60° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of making a plastic molding comprising
   a) applying a metallic layer 20 to 150 nm thick to a translucent plastic film having a thickness of 50 to 750 μm,
   b) applying to the metallized side of the film an adhesive layer 5 to 50 μm in thickness to obtain a product, and
   c) injection molding the product with a translucent thermoplastic wherein after said injection molding, part of the metallic layer is removed by means of a laser beam.

2. The method of claim 1 wherein the translucent plastic film is printed.

3. The method of claim 1 wherein the translucent plastic film is non-printed.

4. The plastic molding obtained by the method of claim 1.

5. The method of claim 1 further comprising laminating to the adhesive layer, prior to said injection molding a translucent plastic film having a thickness of 50 to 750 μm.

6. The method of claim 1 further comprising applying to the adhesive layer, prior to said injection molding, a decorative layer 3 to 40 μm thick.

7. The method of claim 5 further comprising applying to the translucent plastic film, prior to said injection molding, a decorative layer 3 to 40 μm thick.

8. The method of claim 1 further comprising shaping the product prior to said injection molding.

9. The method of claim 5 further comprising shaping the product after said laminating of said translucent plastic film and prior to said injection molding.

10. The method of claim 6 further comprising shaping the product after said applying of said decorative layer and prior to said injection molding.

11. The method of claim 7 further comprising shaping the product after applying said decorative layer and prior to said injection molding.

* * * * *